April 6, 1965  D. LARCHUK ETAL  3,177,366
PHOTOSENSITIVE STAR TRACKING SYSTEM
Filed Sept. 12, 1960  4 Sheets-Sheet 1

INVENTORS
DANIEL R. LARCHUK
CHARLES R. AMMERMAN

BY Harmon & Kurz
ATTORNEY

April 6, 1965  D. LARCHUK ETAL  3,177,366
PHOTOSENSITIVE STAR TRACKING SYSTEM
Filed Sept. 12, 1960  4 Sheets-Sheet 2
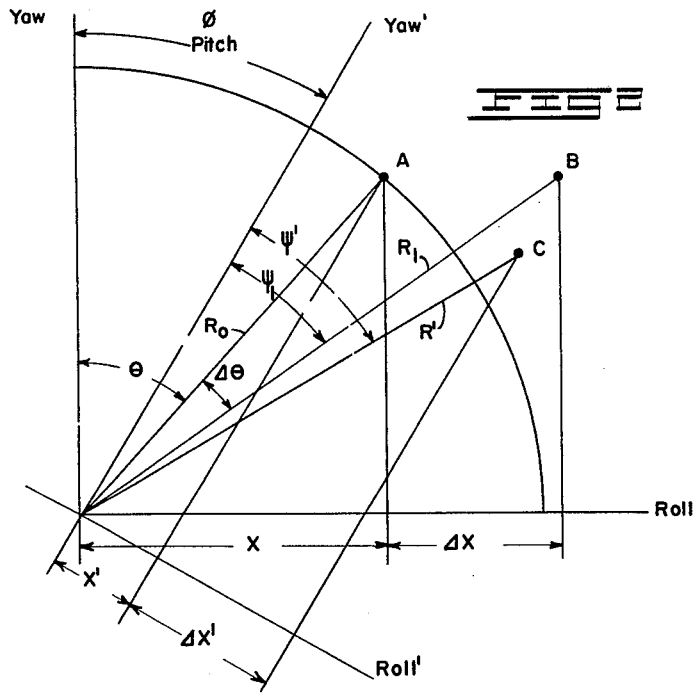
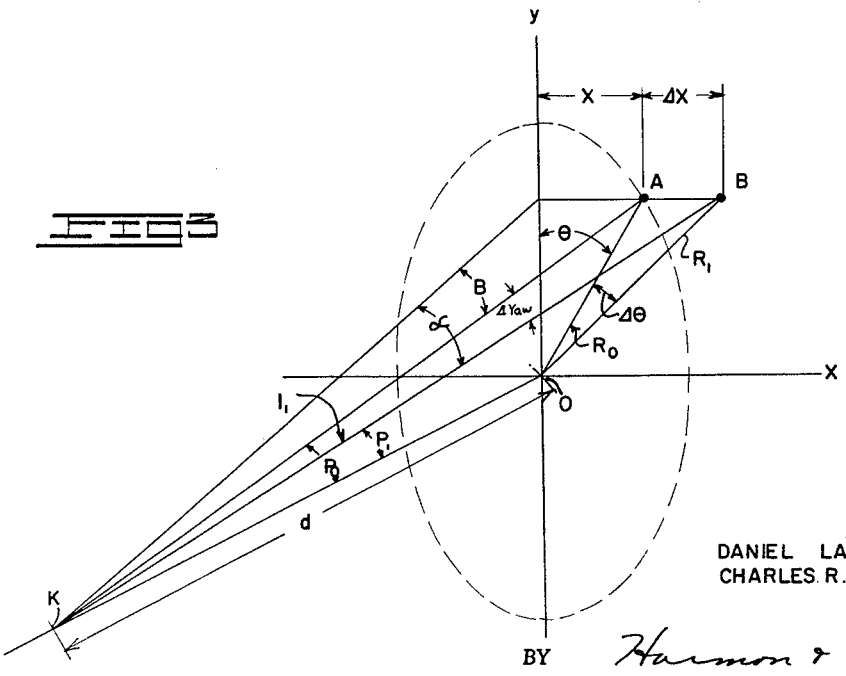
INVENTORS
DANIEL LARCHUK
CHARLES R. AMMERMAN
BY *Harmon & Kurz*
ATTORNEY

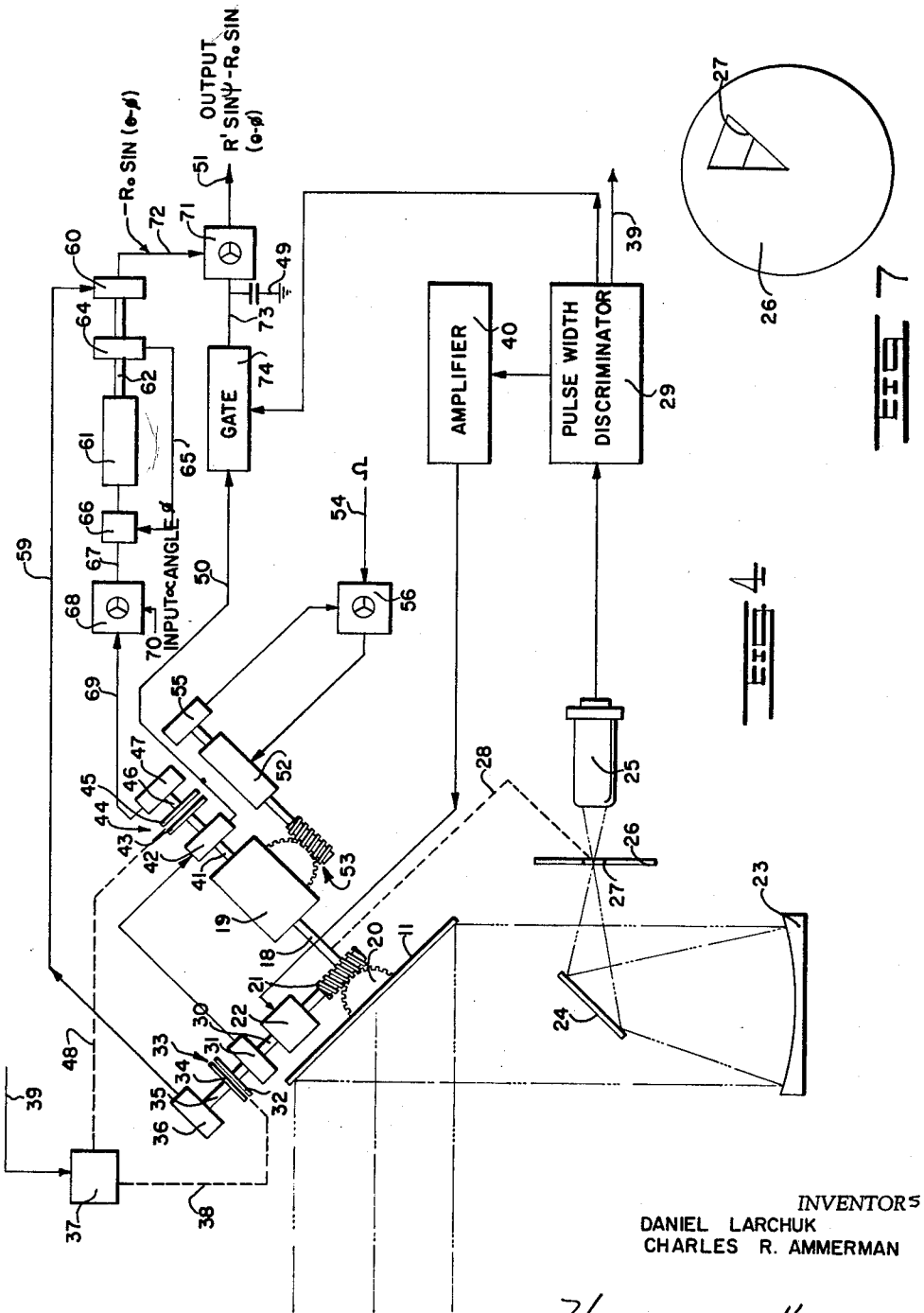

April 6, 1965     D. LARCHUK ETAL     3,177,366
PHOTOSENSITIVE STAR TRACKING SYSTEM
Filed Sept. 12, 1960     4 Sheets-Sheet 4

INVENTORS
DANIEL LARCHUK
CHARLES R. AMMERMAN

BY Harmon & Kurz
ATTORNEY

United States Patent Office 3,177,366
Patented Apr. 6, 1965

3,177,366
PHOTOSENSITIVE STAR TRACKING SYSTEM
Daniel Larchuk and Charles R. Ammerman, State College, Pa., assignors to HRB-Singer, Incorporated, State College, Pa., a corporation of Delaware
Filed Sept. 12, 1960, Ser. No. 55,519
10 Claims. (Cl. 250—203)

This invention relates generally to electro-optical tracking systems and more specifically to an automatic tracking system responsive to a light source of a selected magnitude or greater.

In connection with the navigation and guidance of vehicles on the surface of the earth, above the earth, and into outer space, it is desirable to have an automatic tracking system which will follow a relatively fixed point automatically, whereby either an indication of the position of the vehicle may be given or wherein a control of the vehicle may be had by suitable motive means responsive to the output of a tracking system of this type. In particular, tracking systems such as those utilized for rockets, guided missiles and the like it is extremely necessary that the accuracy of the system be of a refined magnitude. Due to the tremendous distances involved, a space vehicle leaving the earth may rely upon a star as being a relatively fixed point since extensive travel of the vehicle from the earth's surface will make little difference in the angular position of the vehicle relative to the star. In other words a ballistic missile traveling over a range of five to ten thousand miles may refer to a star as a fixed point in its travel to perhaps less than a quarter of degree error in computation. Utilizing a star as a reference point, a vehicle incorporating an exacting electro-optical tracking system thereon may, by this invention, develop a combination attitude reference position signal and monitoring signals whereby to develop an output signal proportional to deviations of the vehicle from a fixed angular position relative to the star. Indications of such deviations as derived from the output signals may be further transmitted back to the earth for tracking purposes, or in the case of a manned vehicle may be displayed in the form of visual information on the vehicle for navigation purposes, and also the signals may be utilized to actuate propulsion devices to effect automatic correction and control of the vehicle in a projected flight through space.

It is the primary object of this invention to provide a precise electro-optical scanning system for developing a usable output signal which is indicative of angular attitude deviations of the system from a fixed source of illumination.

It is a more specific object of this invention to provide an improved electro-optical tracking system which is automatically capable of locating a fixed reference source of illumination and then tracking said source to continually develop an output signal which, if any deviation in attitude from the fixed reference source occurs, will automatically adjust the system to properly maintain a fix on said illumination source and develop an output signal proportional to any deviation from the reference source as a utilization signal for indication or control.

A more specific object of this invention is to provide an improved electro-optical scanning system for vehicles which comprises a scanning mechanism automatically capable of locating a fixed reference source of illumination and developing an electrical reference signal indicative of the attitude of the system relative to the source of illumination, whereby an automatic monitoring system connected with said electro-optical mechanism is capable of developing a deviation signal for comparison with the reference signal whereby the difference between the signal levels may be utilized as a control or indication signal.

A further object of this invention is to provide an electro-optical tracking system for vehicles wherein structure mounted in the vehicle is automatically capable of locating a reference source of illumination and then scanning said source of illumination so that energy received from said source may be reflected through a photo-responsive system to periodically indicate to the scanning system whether or not a deviation in attitude of the vehicle from a prescribed course relative to the angular position of the reference source has occurred.

A still further object of this invention is to provide an automatic light tracking system for vehicles including a scanning system for automatically seeking out and tracking continuously by a suitable scanning mirror a reference source of illumination of at least a particular magnitude in combination with an automatic photo-optical monitoring system whereby the angular deviations in attitude, if any, of the vehicle with respect to the fixed reference source of illumination as located by the scanning system may be impressed upon said scanning system by the output signals from said monitoring system so that an output difference signal may be developed by the combined system for utilization in indication or control means on the vehicle.

A still further object of this invention is to provide an improved light tracking system for vehicles including a scanning system for locating and continuously scanning a fixed reference source of illumination wherein the scanning system is mechanically interconnected with an electrical system so that a reference signal potential may be developed in the electrical system cooperating with said scanning system whereby to impart to the scanning system indications of deviation in attitude of the vehicle relative to the reference source of illumination, so that an electrical deviation signal may be developed to provide an output from the electrical system indicative of the deviation of the vehicle from a fixed course as determined by the difference between the original reference signal potential and the deviation signal potential.

With the foregoing and other objects in view, the invention resides in the following specification and appended claims, certain embodiments and details of construction of which are illustrated in the accompanying drawings in which:

FIGURE 2 is a diagrammatic illustration presenting a two dimensional interpretation of the geomery of the optics under consideration in this application as being incorporated into the functions of the automatic tracker system;

FIGURE 3 is a diagrammatic illustration presenting a three dimensional interpretation of the conical scan geometry of the optics which may be incorporated into the functions of the automatic tracker system;

FIGURE 4 is a diagrammatic view of the tracking system comprising this invention;

FIGURE 7 is a detail of the shutter of the photo-optical monitoring portion of the invention.

Figure 1:
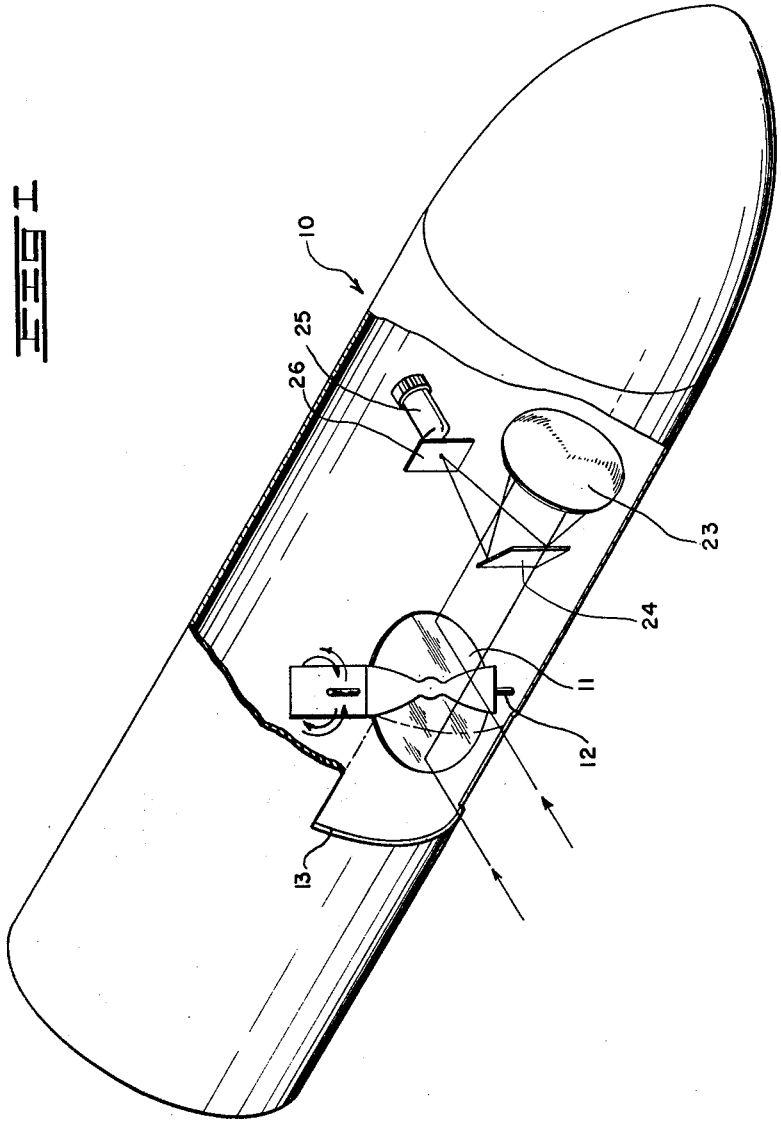
FIGURE 1 is a fragmentary partially cutaway view in perspective of a space vehicle incorporating the automatic tracking system comprising the invention.

Referring more particularly to FIGURE 1 there is illustrated generally a nose cone section 10 of a space vehicle. The vehicle itself while most probably realizing the greatest utilization of the invention in high altitude or space travel could also be a surface vehicle or a regular aircraft and the invention is not limited in application to space flights.

Mounted within the confines of the nose cone 10 is a rotary scanning mirror 11 adjustably mounted about a pivoted support means 12, the axis of which is substantially at right angles to the longitudinal axis of the vehicle. For purposes of scanning an area at an angular position relative to the trajectory of the vehicle or nose cone 10 there is provided a window 13 such that the scanning mirror 11 may continuously seek out and scan a reference source of illumination, not shown. Mounted in spaced relationship within the cone section 10 relative to the mirror 11 is a parabolic reflector 14 for receiving reflected light energy from the mirror 11. Reflections received from the mirror 11 upon the parabolic reflector 14 are further transmitted to a folding mirror 15 from whence the light energy is further reflected to a shutter member 16 and thence to a photo multiplier unit 17. The parts of the tracking system comprising this invention which have just been described comprise the basic scanning and light seeking system for the space vehicle as well as the monitoring system for adjusting the scanning system whereby to maintain a fixed relationship between the tracking system and the reference source. It is necessary that interrelated controls in an electrical system be developed whereby deviations of attitude of the nose cone section 10 from a prescribed course relative to the fixed source of reference illumination may be modified and simultaneously develop a usable output signal for indication purposes or for control of the vehicle.

In order to consider the system whereby the scanning mirror and the monitoring system may cooperate, it is best that a full consideration of the geometry of the system be considered. Assuming that the vehicle has been projected into a prescribed trajectory, it should first be assumed that the scanning mirror is automatically brought into operation to rotate and simultaneously tilt to obtain a fix on a star or other source of illumination having a definitive magnitude. For purposes of theoretical calculation the pitch and yaw angles of the vehicle will be assumed to be zero at acquisition of the reference source of illumination by the scanning mirror 11.

With no change in pitch, a change in yaw appears to move the star from A to B (FIGURE 2). The distance X is the position of zero yaw and $\Delta X$ is the change. $\Delta X$ is determined by computing the value of $(X+\Delta X)$ and subtracting the value of X. FIGURE 2 shows that $X=R_0 \sin \theta$. $R_0$ and $\theta$ are permanently stored by de-energizing, at acquisition in an electrical system to be described. Also, $X+\Delta X=R_1 \sin (\theta+\Delta\theta)$ where $R_1$ is the radius to the new point B. The quantity $\sin (\theta+\Delta\theta)$ is obtained from a sin pot attached to the scanner drive (to be described) which is switched *on* at the instant a star is seen by the photocell. A condenser stores the value of $R_1 \sin (\theta+\Delta\theta)$ between pulses. For the case of zero pitch, the angle $\psi$, corresponds to $\theta+\Delta\theta$.

A pitch of $\phi$ degrees with zero yaw causes the point A to move around the circle of radius $R_0$ toward the yaw axis $\phi$ degrees. The zero yaw point is then represented by the distance $X'=R_0 \sin (\theta-\phi)$. (The pitch angle $\phi$ is a necessary input as is the roll angle $\Omega$.) Since $\theta$ and $R_0$ have been stored and remain constant and $\phi$ is known, $X'$ can be computed. A subsequent yaw, $\Delta X'$, where $\Delta X'$ is a linear representation of a function of the yaw angle, causes the star to move from A to C. Hence, $X'+\Delta X'=R' \sin \psi'$, where $R'$ is measured the same way as $R_1$ and $\psi'$ is measured the same way as $\theta+\Delta\theta$ for the zero pitch case. The output function of the yaw angle is then $R' \sin \psi' - R_a \sin (\theta-\phi) = \Delta X'$.

Having the geometry of FIGURE 2 in mind, reference is now made to the complete scanning system itself incorporating the principles of such geometry in electrical parts, it will be noted that the scanning mirror 11 is rotatably driven by a shaft 18 connected with an electric drive motor 19. Interconnected with a segment gear 20 on the rear of scanner mirror 11 is a worm gear 21 driven directly by a scanner tilt motor 22 as will become apparent later in the specification during a description of the complete operation of the scanner system. The drive connection is intended to be diagrammatic and is not used in a limiting sense. Obviously mirror 11 could not rotate if the sector gear 20 and worm 21 were connected as shown. The motors 19 and 22 function initially in a cooperative manner to generate by means of the mirror 11 a spiral scan of the area viewed through window 13 of the nose cone 10 of a particular vehicle. Once a reference source of illumination of sufficient magnitude for tracking purposes is encountered by the mirror, impulse means, to be described, cause the effect of the tilt motor to be halted whereby continued rotation of the scanner motor 19 and mirror 11 will sweep the area of the reference source of illumination in a conical scan as distinguished from the spiral scan. Thus in referring back to FIGURE 2, the location of the star is at point A along the radial distance $R_0$. With no deviation in attitude of the system or the vehicle carrying the same then the mirror 11 will conically scan the point A with no adjustments of the tilt motor being necessary to maintain the fix on point A.

In order to aid in locating the reference star point A, and switch from a spiral to a conical scan and monitor the position of the system relative to the point A, a cooperative monitoring system is utilized which includes a parabolic reflector 23. Reflections of light energy scanned by mirror 11 are received by reflector 23 and are focused on to a folding mirror 24. From mirror 24 the light energy is directed to a photo-detector 25 unit. Interposed between mirror 24 and unit 25 is a rotary shutter member 26 having a pie-shaped aperture 27 as is illustrated in FIGURE 7. The shutter 26 is driven in synchronism with the mirror 11 by drive motor 19 through a suitable means such as a flexible shaft indicated by the broken line 28. When the spiral scan by mirror 11 begins to encompass the area of reference light source A, reflected energy from the units 23 and 24 will be directed toward the photo-detector 25. During each revolution of shutter 26 a portion of the reflected energy will be permitted to pass through opening 27 to the unit 25. The point of passing through the pie-shaped opening will be determined by the attitude of the mirror 11 relative to the illumination source at the instant the synchronized mirror and shutter are in a position to pass a light pulse to the unit 25. In other words, the coaction of the mirror with the shutter determines the effective duration or pulse width of the signal sent to the unit 25. For monitoring purposes the system is designed to have a pulse width equivalent to a trace passing the opening 27 about midway between the apex and the base of the triangular opening 27. Then in practice deviations in pulse width from the established reference width will cause system corrections to be described. The output signal from the photo-detector unit 25 is fed to a pulse width discriminator 29, where deviations in pulse width from a reference duration as described above are sensed to actuated correction, clutching and switching means as will be described.

The tilt motor 22 has a drive shaft 30 which is connected with a potentiometer 31 and one plate 32 of a clutch 33. The clutch 33 includes a second plate 34 connected by a shaft 35 with a potentiometer 36. During initiation of system operation, by means not shown, the clutch 33 is engaged so that movement of motor 22 will be imparted to potentiometers 31 and 36. A clutch actuator 37 is connected by a suitable linkage 38 with clutch 33 to disengage the same when the actuator is energized. Such energization is derived by an electrical connection with the discriminator 29 over the interrupted line 39. At acquisition of the predetermined pulse width an impulse from discriminator 29 will energize actuator 37 to disengage clutch 33. At this point also an output signal from the discriminator 29 will be fed through an amplifier 40 to the tilt motor 22 to de-energize the same, thereby stopping the spiral scan by mirror 11 and converting to a conical scan of the reference illumination source A as previously explained. With clutch 33 disengaged there will then be stored in potentiometer 36 an electrical reference signal correspond to $R_0$ where $R_0$ is the initial radius to the illumination source A. $R_0$ is the initial radius of the base of the cone in scan at acquisition to the apparent position of the source of illumination A. Pot 31 indicates the instantaneous value of R, in this case $R_1$, in terms of the tilt angle or cone angle of the scanner mirror. This information must multiply the output of pot 42 to give $R_1(\sin \theta + \Delta\theta)$. Pot 42 provides instantaneous values of $\theta$, in this case $\theta + \Delta\theta$.

Connected to the shaft 41 to the drive motor 19 is a potentiometer 42 and one plate 43 of a clutch 44. Clutch 44 includes a second plate 45 connected to a shaft 46 which drives a potentiometer 47. Clutch 44 is disengaged by actuator 37 through suitable linkage indicated by broken line 48 simultaneously with the clutch 33. Pitch and yaw angles may be assumed to be zero at acquisition of reference point A. As stated with reference to FIGURE 2, with no change in pitch a change in yaw appears to move the star from A to B. The distance X is the position of zero yaw $\Delta X$ is the change. FIGURE 2 shows that $X = R_0 \sin \theta$. Reference information relative to the angle $\theta$ is stored on potentiometer 47 upon disengagement of clutch 44. When the cone 10 deviates in attitude from the acquired reference position due to a change in yaw, with no change in pitch, the star appears to move from A to B in FIGURE 2, and $R_1$ is the radius to the new point B. Then $X + \Delta X = R_1 (\sin (\theta + \Delta\theta))$. The quantity $(\theta + \Delta\theta)$ is obtained from potentiometer 42 which is energized at the instant a star is seen by the photo unit 25. A condenser 49 connected to line 50, in turn connected to potentiometer 42 stores the value of $R_1 \sin (\theta + \Delta\theta)$ between pulses. For the case of zero pitch, the angle $\psi$ corresponds to $\theta + \Delta\theta$.

Referring again to FIGURE 2, a pitch of $\phi$ degrees with zero yaw causes the point A to move around the circle of radius $R_0$ toward the yaw axis $\phi$ degrees. The zero yaw point is then represented by the distance $X' = R_0 \sin (\theta - \phi)$. Since $\theta$ and $R_0$ have been stored and remain constant and since $\phi$ is known, $X'$ can be computed. A subsequent yaw $\Delta X'$, causes the star to move from A to C. Hence, $X' + \Delta X' = R' \sin \psi'$ where $R'$ is measured the same way as R, and $\psi'$ is measured the same way as $\theta + \Delta\theta$ for the zero pitch case. The yaw angle therefore, and the output of the system at 51, will be $R' \sin \psi' - R_0 \sin (\theta - \psi)$.

Figure 6:
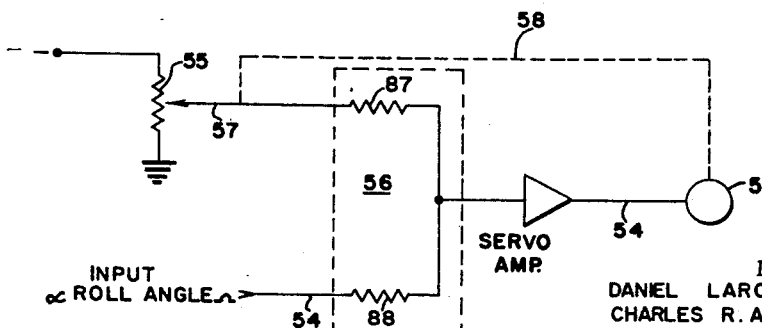
FIGURE 6 is an electrical schematic diagram of the roll orientation correction servo system of this invention.

Since a false yaw data output would be forthcoming without a correction for roll of the cone 10, corrections for changes in the roll angle $\Omega$ are made by a roll correction servo motor 52 coacting through a suitable attitude correcting coupling 53 for the scanner motor 19. As shown in FIGURE 4, such reference roll information is fed to motor 52 along line 54 from a suitable reference source such as a gyro, not shown. The schematic diagram of the system is illustrated in FIGURE 6 where a potentiometer 55 is driven by motor 52 and is connected in feedback relationship with a balancing circuit 56 in line 54. Resistors 87 and 88 in circuit 56 provide isolation between the input from potentiometer 55 and the input proportional to roll angle $r$, respectively, and these resistors are therefore of a large value with respect to the impedance of these two inputs to circuit 56. Changing roll information presented to circuit 56 will cause the motor 52 to drive the potentiometer arm 57 through connection 58 to a balanced voltage condition as adjustment of the scanner motor 19 is made.

Figure 5:
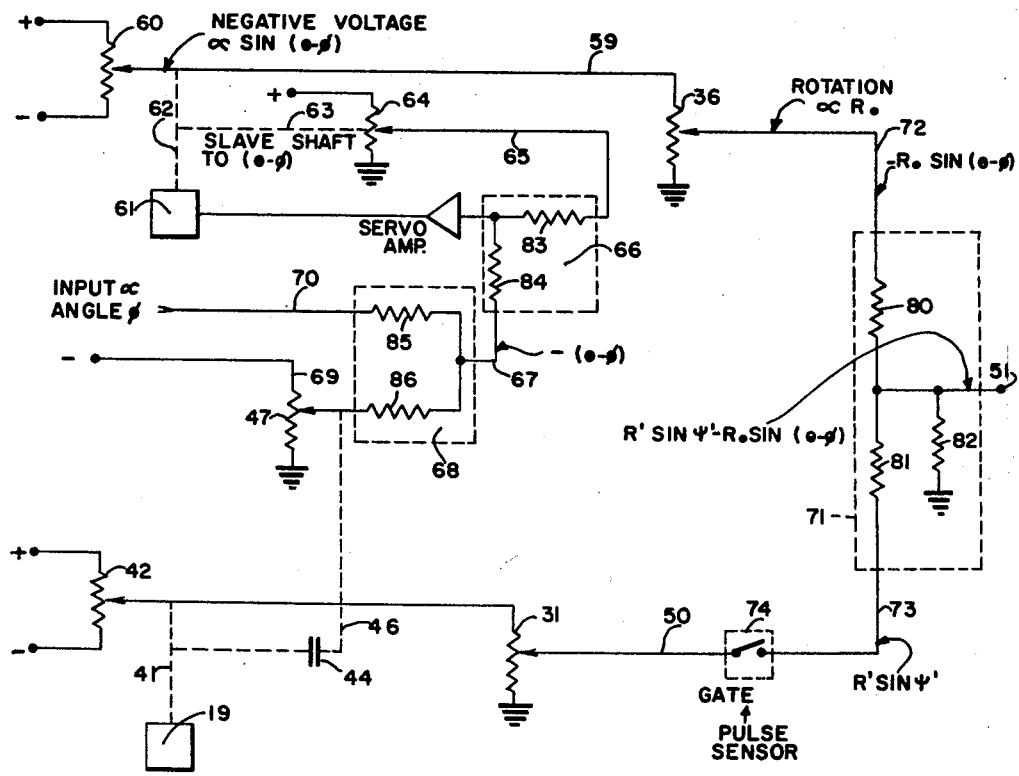
FIGURE 5 is an electrical schematic diagram of the yaw angle computer of the tracking system of this invention.

Referring now to FIGURES 4 and 5 it will be noted that the potentiometer 36 is connected by a line 59 to a potentiometer 60 which resolves information proportional to $\sin (\theta - \phi)$. Adjustments of potentiometer 60 are made by a servo motor 61 which is in direct drive relationship therewith by the shaft 62. Also connected directly with the motor 61 by shaft 62 and a slave shaft 63 (broken lines FIGURE 5) is a potentiometer 64 from which voltage information is fed back along a line 65 to a balancing circuit 66. The output of circuit 66 determines the direction and magnitude of rotation of the potentiometers 60 and 64. The input to circuit 66 is a voltage on a line 67 as derived from a differencing circuit 68. One input to circuit 68 along line 69 is representative of the stored signal on potentiometer 47 relative to the angle $\theta$. The other input along line 70 is representative of and proportional to the angle $\phi$ derived from a source of pitch information, such as a gyro, not shown. Resistors 83 and 84 in circuit 66 and resistors 85 and 86 in circuit 68 have exactly the same function, with respect to the circuit inputs, as do resistors 87 and 88 in balancing circuit 56 as described above. That is, the resistors provide isolation of the dual inputs to the respective circuits in which they appear.

A computing or resolving circuit 71 receives an input voltage from line 72 representing $-R_0 \sin (\theta - \phi)$ to be compared with an input voltage from a line 73 representing $R' \sin \psi'$. Resolving circuit 71 includes three resistors, resistor 80 in series with line 72, resistor 81 in series with line 73, and resistor 82 between the output line of terminal 51 and ground. Resistors 80 and 81 are equal and of sufficiently large value such that the separate currents drawn in the two paths 72 and 73 do not disturb the linearity of potentiometers 36 and 31 respectively, and further such that the output signal appearing at terminal 51 is proportional to the sum of the input voltages. Resistor 82 is a loading resistance selected in accordance with the electrical impedance of apparatus connected to terminal 51, and is of sufficiently low value to provide a low output impedance such that circuit operation is not disturbed through loading effects. Interposed between lines 50 and 73 is a gating system 74 which is controlled in operation by pulses from the discriminator 29. The gating system, as a practical matter, is periodically operable to pass signals from potentiometer 42 to circuit 71 for comparison with the reference signal input to derive an output signal at terminal 51 equal to $R' \sin \psi' - R_0 \sin (\theta - \phi)$. Actually, however, assuming there were no deviation in attitude of the cone 10 and the optical system generally from the fixed angular position relative to the point A, then the gated output on line 73 would not vary and the output at terminal 51 would be constant. However, this ideal situation would only exist in theory and actually the signals at 51 proportional to deviations of vehicle attitude may be utilized either to correct the attitude or indicate the attitude by suitable means, not shown.

The operation of the tracking system, in summary, therefore, will now be apparent to one skilled in the art. When the cone 10 or other vehicle is projected on its course, automatic means, not shown, will energize motors 19 and 22 to start a spiral scan of the area transversely of the vehicle path of travel. When a reference source of illumination is picked up in the scan, the monitoring system of the tracker will respond to obtain a fix on the source by means of the integrated connections between the optical, mechanical and electrical portions of the entire system. The pulse width discriminator will send corrective signals to the tilt motor 22 to adjust the conical scan of the light source in a compensating manner for roll, pitch and yaw of the cone 10. Adjustments for these deviations are set up in the electrical readout system for comparison with the reference electrical information stored in the electrical system at acquisition of the original fix on the reference source of illumination. Any output signal appearing at output terminal 51 will be indicative of vehicle angular deviations from a prescribed course, and as such, such a signal may be utilized to control the vehicle attitude by suitable means, not shown, or may be utilized to operate suitable vehicle or land based tracking equipment.

The geometry of FIGURE 2 is quite accurate and adequate if the output of the system is to be used for control purposes, but such geometry is not precise. By this we mean that deviations (from the yaw angle that exists when a star is acquired) will be small. In FIGURE 2 the distances $R_1$, $R'$ and $X$, $\Delta X$ represent ½ the cone angle and the yaw angles respectively.

If it is necessary to measure absolute yaw angles, the cone angle must be kept small (about 5°) or a more exact geometrical interpretation must be used. This geometry is shown in FIGURE 3. The optical system in FIGURE 3 is assumed to be positioned at the point K. Here it is seen that the reference yaw angle is $\beta$ and that a change in yaw is represented by $\alpha-\beta$.

Also
$$X = d \tan \rho_0 \sin \theta$$
$$X + \Delta X = d \tan \rho_1 \sin (\theta + \Delta\theta)$$

where $d$ is an arbitrary distance between the scanner at point K and the XY plane which is perpendicular through the point O to the Z axis Therefore,
$$\sin \alpha = \sin \rho_1 \sin (\theta + \Delta\theta)$$
$$\sin \beta = \sin \rho_0 \sin \theta$$

Since $\alpha \gtrless \rho_1$ and $\beta \gtrless \rho_0$, $\sin \alpha$, $\sin \beta$, $\sin \rho_1$, $\sin \rho_0$ can be replaced by the angle expressed in radians as long as the cone angles $\rho_0$ and $\rho_1$ are small. This is the condition represented by FIGURE 2 wherein:

$$\alpha = X + \Delta X, \quad \beta = X, \quad \rho_1 = R_1, \quad \rho_0 = R_0$$

Since the optical system puts a practical limit on the cone angle of about 30° for half the angle ($\rho_{max} = 30°$) these liberties can be taken if changes in yaw are small and oscillate about some equilibrium point. The only effect is that the output, in this case an error signal, is not linear with the error.

The functional drawing of FIGURE 4 can accommodate the exact geometry of FIGURE 3 by making the following changes. Potentiometers No. 31 and 36 are replaced by sine potentiometers. The information carried by line 72 is then:

$$-\sin \rho_0 \sin (\theta - \phi)$$

and that on line 50 is:

$$\sin \rho' \sin \psi$$

The value $\rho'$ does not appear on the accompanying sketch because only the zero pitch case is illustrated but $\rho'$ compares with $R'$ of FIGURE 2. With no further changes the output would give the difference of the sines of the angles $\alpha$ and $\beta$. The sine to angle conversion can be made by inserting a suitable calibrated network in line 72 and line 50. Over the range of 30° the conversion from sine $\alpha$ to angle $\alpha$ can be easily done electronically. If this is done the output would be the difference of the angles $\alpha$ and $\beta$.

The invention as illustrated may be subject to numerous modifications well within the purview of these inventors, who intend only to be limited to a liberal interpretation of the concepts present in the appended claims.

We claim:

1. An electro-optical system for locating a reference source of illumination and deriving measurements indicative of the angular relation between said source and system comprising an optical receiving mirror, driving means including a tilt motor and a rotary drive motor coacting with said scanning mirror to drive said mirror to scan a spiral path to locate an illumination reference source, means to de-energize the tilt motor of the driving means for said mirror upon location of the reference source, whereby to convert the spiral scan by the mirror into a conical scan, means to establish an electrical reference signal representative of the orientation of the system relative to the reference illumination source, optical means to monitor the orientation of the system relative to the reference illumination source, and means responsive to said monitoring means to derive an electrical signal representing angular deviations of the system, when they occur, as determined by the monitoring means, for comparison with the electrical reference signal.

2. An electro-optical system for locating a reference source of illumination and deriving measurements indicative of the angular relation between said source and system comprising an optical receiving mirror, driving means including a tilt motor and a rotary scan motor for adjusting and rotating said scanning mirror respectively to locate and scan an illumination reference source, means responsive to the location of an illumination reference source whereby to de-energize the tilt motor to convert the scan by said mirror from a spiral scan to a conical scan of said illumination reference source, means for providing an electrical reference signal representative of the orientation of said system relative to said illumination reference source, optical means to monitor the orientation of the system relative to the reference illumination source, means responsive to angular deviations of the system relative to said illumination source whereby to re-energize said tilt motor, said optical means responsive to said re-energization of said tilt motor, detection means responsive to said optical means to establish an electrical signal representing said angular deviation, and means to compare the angular deviation signal with the electrical reference signal.

3. An electro-optical system for locating a reference source of illumination and deriving measurements indicative of the angular relation between said source and system comprising a scanning mirror, motor means to rotate said mirror, motor means to cooperate with said rotating means to adjust the tilt of said mirror, both said motor means coacting to drive said mirror to create a spiral scan to locate an illumination reference source, means to de-energize said motor for adjusting the tilt of said mirror whereby to convert the scan of said mirror from a spiral scan to a conical scan, means coacting with said tilt motor to establish an electrical reference signal representative of the orientation of the system relative to the reference illumination source, optical means to monitor the orientation of the system relative to the reference illumination source, and means responsive to said monitoring means to derive an electrical signal representing angular deviations of the system when they occur as determined by the monitoring means, for comparison with the electrical reference signal.

4. An electro-optical system for locating a reference source of illumination and deriving measurements indicative of the angular relation between said source and system comprising an optical receiving mirror, driving means to adjust said receiver to locate an illumination reference source with a spiral scan motion, means to convert the spiral scan motion of the mirror to a conical scan motion upon acquisition of an illumination reference source, means to establish an electrical reference signal representative of the orientation of the system relative to the reference illumination source, reflecting means for receiving and reflecting energy from said reference illumination source as received by said scanning mirror, photo-detector means for receiving energy from said reflecting means, apertured rotary shutter means for interrupting the transmission of energy between said reflecting means and said photo-detector means to derive an electrical signal output proportional to light energy input, said shutter means being driven in synchronism with the driving means, and means responsive to the output signal of said photo-detector means to affect the driving means whereby to derive an electrical signal representing angular deviations of the system, when they occur, as determined by the signal from the photo-detector, for comparison with the electrical reference signal.

5. An electro-optical system for locating a reference source of illumination and deriving measurements indicative of the angular relation between said source and system comprising an optical receiver, driving means to adjust said receiver to locate and scan an illumination reference source, an electrical computing system, said system including a plurality of variable resistance means, clutch means, means to selectively connect said variable resistor means of said electrical reference system to the driving means of the electro-optical system for the receiver, optical means to monitor the orientation of the electro-optical system relative to the reference illumination source and to disengage the clutch means upon the location of the reference source, means responsive to disengagement of the clutch means to establish a reference signal in the variable resistance means of the computing system, and detection means coacting with said optical monitoring means and responsive to angular deviations of the optical system from the reference illumination source for creating a deviation electrical signal in the reference system for comparison with the electrical reference signal.

6. An electro-optical system for locating a reference source of illumination and deriving measurements indicative of the angular relation between said source and system comprising an optical receiver, driving means to adjust said receiver to locate an illumination reference source with a spiral scan motion and to conically scan said source, means to establish an electrical reference signal representative of the orientation of the system relative to the reference illumination source, optical means to monitor the orientation of the system relative to the reference illumination source, detection means responsive to said optical means to provide an electrical signal, and comparison means for deriving an electrical output signal representing angular deviations of the system relative to the source, based upon a comparison of said electrical signal from said detection means with said electrical reference signal.

7. An electro-optical tracking system for vehicles capable of locating a reference source of illumination and deriving measurements indicative of the attitude of the vehicle relative to said source of illumination comprising an optical receiver, driving means to adjust said receiver to locate an illumination reference source with a spiral scan motion, means to convert the spiral scan motion of the receiver to a conical scan motion, means to establish an electrical reference signal representative of the orientation of the vehicle relative to the reference illumination source, optical means to monitor the orientation of the system on the vehicle relative to the reference source illumination, and means responsive to said optical monitoring means to derive an electrical signal representing attitude deviations of the vehicle, when they occur, as determined by said optical monitoring means, for comparison with the electrical reference signal to obtain the utilization electrical signal output for display or control purposes.

8. An electro-optical tracking system for vehicles for locating reference source of illumination and deriving measurements indicative of the angular relation between said source and the vehicle comprising an optical receiving mirror, driving means including a tilt motor and a rotary scan motor for adjusting and rotating said scanning mirror respectively to locate and scan an illumination reference source, means responsive to the location of an illumination source whereby to de-energize the tilt motor to convert the scan by said mirror from a spiral scan to a conical scan of said illumination reference source, optical means to monitor the orientation of the vehicle relative to the reference illumination reference source, means responsive to angular deviations of the vehicle relative to said illumination source whereby to re-energize said tilt motor, said optical monitoring means responsive to said re-energization of said tilt motor, detection means responsive to said optical monitoring means to establish an electrical signal representing said angular deviation, and means to compare the angular deviation signal with the electrical reference signal.

9. An electro-optical tracking system for vehicles for locating a reference source of illumination and deriving measurements indicative of the instantaneous angular relation between said source and the vehicle comprising an optical receiving mirror, driving means including a tilt motor and a rotary scan motor for adjusting and rotating said scanning mirror respectively to locate and scan an illumination reference source, means responsive to the location of an illumination source whereby to de-energize the tilt motor to convert the scan by said mirror from a spiral scan to a conical scan of said illumination reference source, an electrical computing system, means coincident with the de-energizing means for the tilt motor to establish a fixed reference signal in the electrical computing system, optical means to monitor the orientation of the vehicle relative to the referenec illumination source, means responsive to yaw deviations of the vehicle relative to said illumination source whereby to re-energize said tilt motor, said optical monitoring means responsive to said re-energization of the tilt motor, detection means responsive to said optical monitoring means to establish an electrical signal representing the change in yaw of the vehicle, and means to compare in the electrical computing system the angular deviation signal with the electrical reference signal.

10. An electro-optical tracking system for vehicles for locating a reference source of illumination and deriving measurements indicative of the angular relation between said source and the vehicle comprising an optical receiving mirror, driving means including a tilt motor and a rotary scan motor for adjusting and rotating said scanning mirror respectively to locate and scan an illumination reference source, means responsive to the location of an illumination reference source whereby to de-energize the tilt motor to convert the scan by said mirror from a spiral scan to a conical scan of said illumination reference source, an electrical computing system, means coincident in operation with the de-energization of the tilt motor to establish in the computing system a reference electrical signal, optical means to monitor the orientation of the vehicle relative to the reference illumination source, means responsive to deviations in yaw of the vehicle relative to said illumination source whereby to re-energize said tilt motor, said optical monitoring means responsive to said re-energization of the tilt motor, detection means responsive to said optical monitoring means to establish in the electrical computing system an electrical signal representing said yaw deviation, automatic means to adjust the rotary scan motor drive means to compensate for roll deviations of the vehicle with respect to the reference source of illumination, automatic means connected with the electrical system to compensate for changes in pitch of the vehicle relative to the reference source of illumination, and means to compare the angular yaw deviation signal with the electrical reference signal in the electrical system to obtain a utilization signal output.

References Cited by the Examiner

UNITED STATES PATENTS

| | | | |
|---|---|---|---|
| 2,762,123 | 9/56 | Schultz et al. | 250—203 |
| 2,922,224 | 1/60 | Gray | 250—203 |
| 2,958,784 | 11/60 | Blackstone | 250—203 |
| 2,987,622 | 6/61 | Berry | 250—236 |
| 3,002,097 | 9/61 | Nuut | 250—203 |

RALPH G. NILSON, *Primary Examiner.*

CHESTER L. JUSTUS, *Examiner.*